Feb. 6, 1962  H. L. BARTELT  3,019,884
BELT DRIVE FOR CHECK WEIGHER
Filed March 30, 1959  2 Sheets-Sheet 1
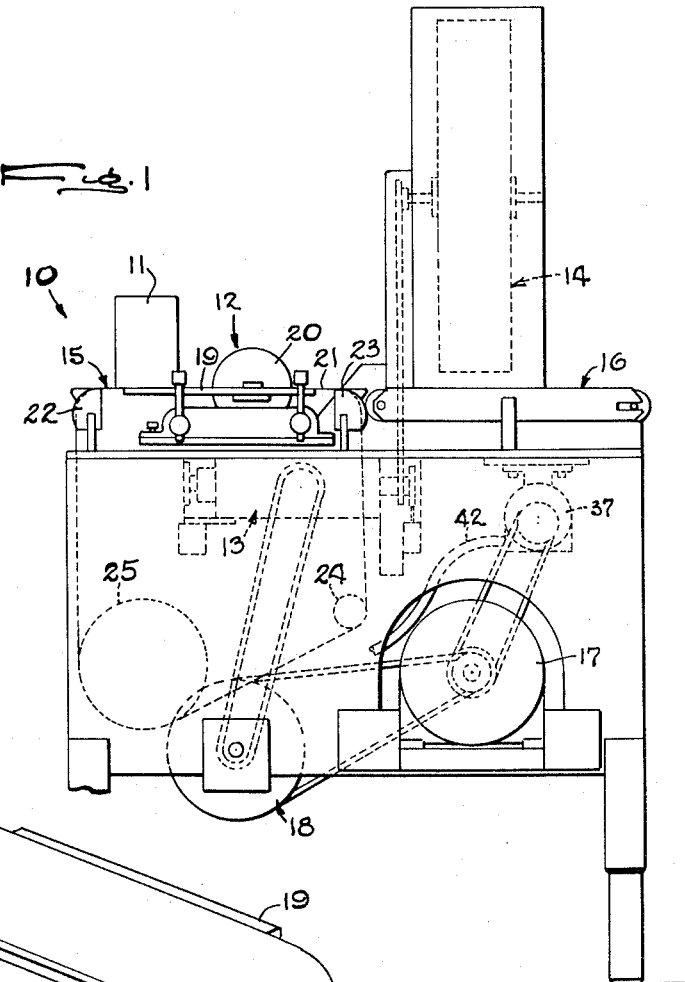
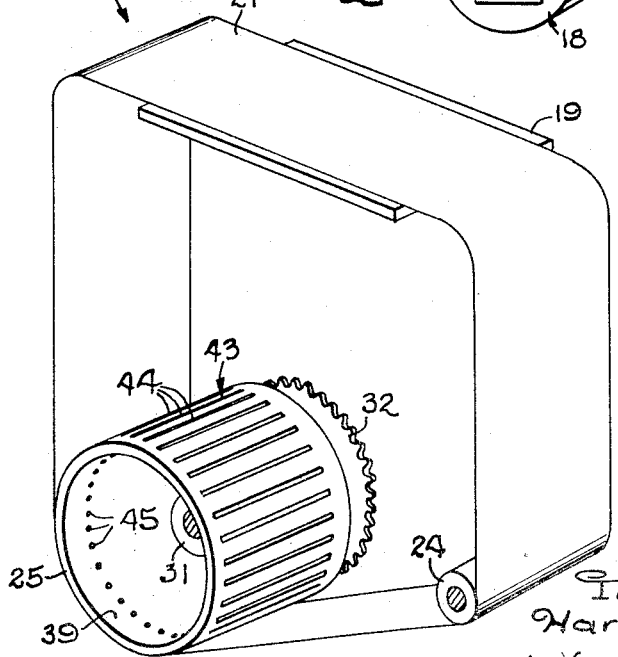
INVENTOR
Harold L. Bartelt
by Wolfe, Hubbard, Voit & Osann
ATTORNEYS

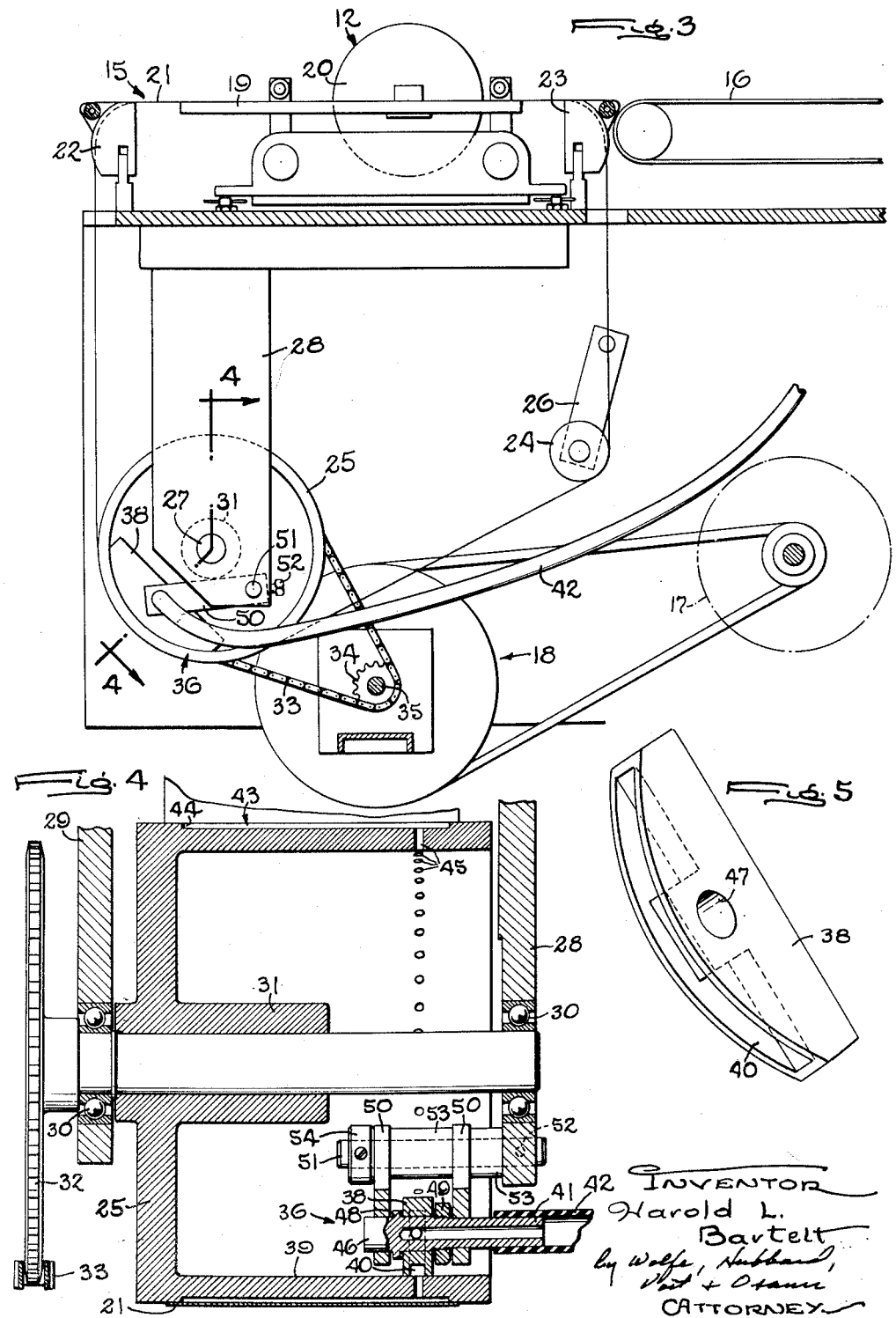

United States Patent Office 3,019,884
Patented Feb. 6, 1962

3,019,884
BELT DRIVE FOR CHECK WEIGHER
Harold L. Bartelt, Rockford, Ill., assignor to Bartelt Engineering Company, Inc., Rockford, Ill., a corporation of Delaware
Filed Mar. 30, 1959, Ser. No. 802,712
2 Claims. (Cl. 198—39)

This invention relates to a machine for weighing packages and for classifying the packages according to their weight, and more particularly to a machine in which the packages are advanced over a weighing scale platform by an endless belt conveyor.

The general object of the invention is to provide in a machine of the above character a belt conveyor constructed in a novel manner whereby the belt is operated in a slack condition to deflect readily in response to the weight of the packages so as not to distract from the accuracy of the weighing of the packages.

Another object is to achieve the foregoing object without any of the driving parts engaging the side of the belt which carries the product being weighed whereby to maintain the sanitary condition of this side.

A more detailed object is to drive the belt by a single rotating drum by utilizing a vacuum to hold the belt against the drum and impart the motion of the drum to the belt.

The invention also resides in the novel mechanism for creating a vacuum between the belt and the drum.

Other objects and advantages of the invention will become apparent from the following detailed description taken in connection with the accompanying drawings, in which:

FIGURE 1 is a side elevational view of a check weigher constructed in accordance with the present invention.

FIG. 2 is a perspective view of the belt and drum for driving the belt.

FIG. 3 is a fragmentary side view of the weighing device showing the conveyor belt and the mechanism for driving the belt.

FIG. 4 is a sectional view taken along line 4—4 in FIG. 3.

FIG. 5 is a perspective view of the shoe used on the suction head.

For purposes of illustration, the present invention is shown in the drawings embodied in a check weigher 10 for use in conjunction with packaging machines to check the weight of the filled packages and determine whether the weight is within an acceptable range or above or below that range and to classify the packages accordingly. In such devices, the packages 11 pass over a weighing mechanism 12 which transmits a signal, operable through a suitable actuator 13, to shift a classifier 14 which separates the overweight and underweight packages from those weighing within the permissible range. The packages are moved past the weighing mechanism 12 and classifier 14 on two belt conveyors 15 and 16, one carrying the packages through a weight checking station and the other carrying them through a classifying station. Power to drive the conveyor belts 15 and 16 and the actuator 13 for the classifier 14 is provided by a motor 17 mounted on the frame of the device and coupled to the elements through suitable speed reducing means 18.

The weighing mechanism 10 comprises a scale platform 19 operable to deflect downwardly in response to the weight of the packages and a weighing head 20 which produces a signal corresponding to the weight of the package and operable to motivate the classifier. The packages are moved across the scale platform 19 by a continuously driven belt 21, which forms a loop around two guide shoes 22 and 23, an idler 24 and a driving drum 25 (FIG. 3). The guide shoes 22 and 23 are aligned with the scale platform 19 with one shoe disposed adjacent either end of the platform and providing a horizontal run of the belt to advance the packages across the platform. The tension of the belt may be adjusted by moving the idler roll 24 to increase or decrease the length of the path followed by the belt. For this purpose, the roll 24 is journaled on an arm 26 which is pivoted on the frame to move the roll toward or away from the center of the loop formed by the belt.

The belt 21 is driven endwise around the loop by the driving drum 25 which is fixed to a shaft 27 journaled on the frame to turn about a horizontal axis. The shaft 27 spans two parallel frame members 28 and 29 and is journaled in bearings 30 mounted in the members. The drum 25 is disposed between the frame members and is fixed to the shaft 27 through the medium of a boss 31 cast integrally with the drum and bored to receive the shaft. Rotation of the shaft 27 is effected through the medium of a sprocket 32 fixed to an extension of the shaft projecting beyond the frame member 29 and driven by a chain 33 coupling it to a sprocket 34 on the shaft 35 of the speed reducing mechanism 18. The speed reducing mechanism, in turn, is driven by the motor 17.

In the present instance, in order for the check weigher to be sensitive to variations in the weight of the packages, the conveyor belt 21 is made from a light weight and flexible material, preferably nylon, so as to deflect readily in response to the weight of the packages disposed on the belt. In addition, the belt 21 is operated in a slack condition permitting it to bow downwardly between the two guide shoes 22 and 23 when the scale platform 19 is deflected. Normally, the driving engagement between the drum and the belt has been obtained through the use of an additional member, such as a roller (not shown), which engages the other side of the belt and presses the latter against the drum with sufficient force to prevent slipping. In some instances, such as when a food product is to be carried directly by the belt, sanitary as well as other requirements preclude any parts touching the outside of the belt.

To drive the belt 21 by the drum 25 alone without slippage and without any drive element contacting the outside of the belt, the present invention contemplates the provision of a novel means for holding the belt in driving engagement with the drum which means operates from the drum side of the belt. This means includes a plurality of openings 43 formed in the drum periphery and angularly spaced around the circumference of the drum to be connected successively with a source of vacuum which draws the belt against the drum. The arrangement is such that substantially all of the openings along the arc of contact between the drum and the belt are connected to the vacuum source.

In order to connect the vacuum source to the successive openings 43, a suction head 36 is disposed within the driving drum and connected to a suitable source of vacuum such as a pump 37. A shoe 38 attached to the suction head 36 slidably engages the inner periphery 39 of the drum along the arc of contact between the drum and the belt (FIG. 3). The side of the shoe 38 in engagement with the drum is curved with the radius of curvature being substantially equal to the radius of curvature of the drum. The shoe 38 is preferably made of a bearing material such as nylon or the like which prevents undue wear on the engaging surfaces and reduces the leakage between the two members.

A slot is formed in the curved surface of the shoe to form a passage 40 from which the air is withdrawn to create a vacuum. The air is withdrawn from the passage 40 through a pipe 41 communicating with the passage 40 and having one end attached to a hose 42 connecting it to the vacuum pump 37. The vacuum created in the passage 40 is communicated to the outer surface from the interior of the drum through openings 43 positioned so as to pass through the passage 40 formed in the shoe 38 as the drum 25 is rotated.

In the present instance, the openings 43 formed in the drum comprise elongated outwardly opening grooves 44 extending transversely of the drum 25 and angularly spaced around the periphery of the drum. The length of the grooves is substantially equal to the width of the belt. It will be apparent, therefore, that the attractive force exerted on the belt by the vacuum extends along substantially the entire arc of contact between the belt and the drum and, by the provision of the grooves, extends substantially across the width of the belt. The grooves 44 communicate with the shoe through apertures 45, one for each of the grooves and connecting the associated groove to the interior of the drum and thereby to the passage 40 formed in the shoe as the aperture 45 is rotated through the passage 40.

The suction head 36 is disposed within the drum 25 and is mounted so as to permit the attached shoe 38 to slide along the drum without exerting undue pressure on the drum and to adapt itself to any irregularities in the curvature of the drum. To this end, the mounting has two pivot points, one between the suction head 36 and the frame 27 and the other between the shoe 38 and the suction head.

To mount the shoe, the pipe 41 connecting the passage 40 formed in the shoe 38 to the hose 42 leading to the pump 37 is inserted through a hole 47 in the shoe with an extension 46 protruding beyond the inner side of the shoe. A flange 48 formed on the extension 46 abuts one side of the shoe 38 and a nut 49 threaded on the pipe abuts the opposite side to hold the shoe in position. The pipe 41 extends between two arms 50 mounted on the frame of the check weigher and is journaled on the arms to turn about a horizontal axis. The other ends of the arms 50 are journaled on a pin 51 having one end projecting through the frame member 28 with the other end projecting into the open end of the drum parallel to the pipe 41. The pin 51 is secured to the frame member 28 by a set screw 52 threaded into the member to abut the pin. Spacers 53 between the arm 50 and the frame 28 and between the arms maintain the arms 50 in the desired relative position. The assembly is held on the pin 51 by a collar 54 telescoped on the pin and abutting the innermost arm and secured to the pin by a set screw.

With the arrangement described, the shoe 38 may pivot relative to the arms 50 and thereby adapt itself to the curvature of the drum 25. In addition, the arms 50 may pivot relative to the pin 51 whereby the weight of the suction head 36 is utilized to maintain contact between the shoe and the drum while permitting the suction head to float and change position responsive to any irregularities in the curvature of the drum.

A drive pulley constructed as described above, enables a belt conveyor, such as that used in the instant case, to operate with the belt in a slack condition thereby facilitating its use on a weighing device by permitting it to deflect readily in response to the weight of the packages moved over the device of the belt. The present invention also enables the use of a light weight, flexible belt since there is no need for a friction surface, such as rubber or the like, to be applied to one side of the belt and since the contact stresses exerted on the belt are at a minimum. The belt is driven through contact with its inner surface only which makes the conveyor adaptable for use in processing unpackaged foods since the outside of the belt is maintained in a sanitary condition. In addition, driving the belt without physical contact with its outer surface insures that the efficiency of the machine will not be affected by spillage or product residue on the outer surface of the belt.

I claim as my invention:

1. In a check weigher, the combination of, a weighing device having a platform adapted to deflect vertically in response to the weight of an article on the platform, an endless belt having a run extending across said platform, guide rolls supporting said belt, a drum mounted to turn about a horizontal axis with the belt extending around and in contact with the outer surface of an arc of the drum, said drum having a plurality of openings formed therein and connecting the outer surface with the interior of the drum, a mounting frame projecting into said drum, a member pivotally attached to said frame, and means to support said frame and said member in floating relationship with said drum with the member being in running contact with the inner surface of the drum overlying a portion of said openings in the arc of the drum contacting the belt.

2. In a check weigher, the combination of, a weighing device having a platform adapted to deflect vertically in response to the weight of an article on the platform, an endless belt having a run extending across said platform, guide rolls supporting said belt, a drum mounted to turn about a horizontal axis with the belt extending around and in contact with the outer surface of an arc of the drum, said drum having a plurality of openings formed therein and connecting the outer surface with the interior of the drum, a bar pivotally mounted to turn about a horizontal axis and projecting into said drum, a member disposed within said drum in running contact with the inner surface thereof and overlying at least a portion of said openings in the arc of the drum contacting the belt, said member being pivotally mounted on said bar to turn about a second horizontal axis parallel to the first axis whereby the member may turn about the second axis to closely engage the interior of said drum and said bar may turn about said first axis to move said member in contact with the drum, said member having a passage communicating with the openings in said arc, a source of vacuum connected to said passage thereby to communicate with the openings and hold said belt against said drum, and means turning said drum thereby to advance said belt.

References Cited in the file of this patent

UNITED STATES PATENTS

| | | |
|---|---|---|
| 566,637 | Wallis | Aug. 25, 1896 |
| 1,922,883 | Crago | Aug. 15, 1933 |
| 2,837,330 | Lawrance | June 3, 1958 |

FOREIGN PATENTS

| | | |
|---|---|---|
| 1,146,028 | France | Nov. 5, 1957 |